Patented Nov. 21, 1950

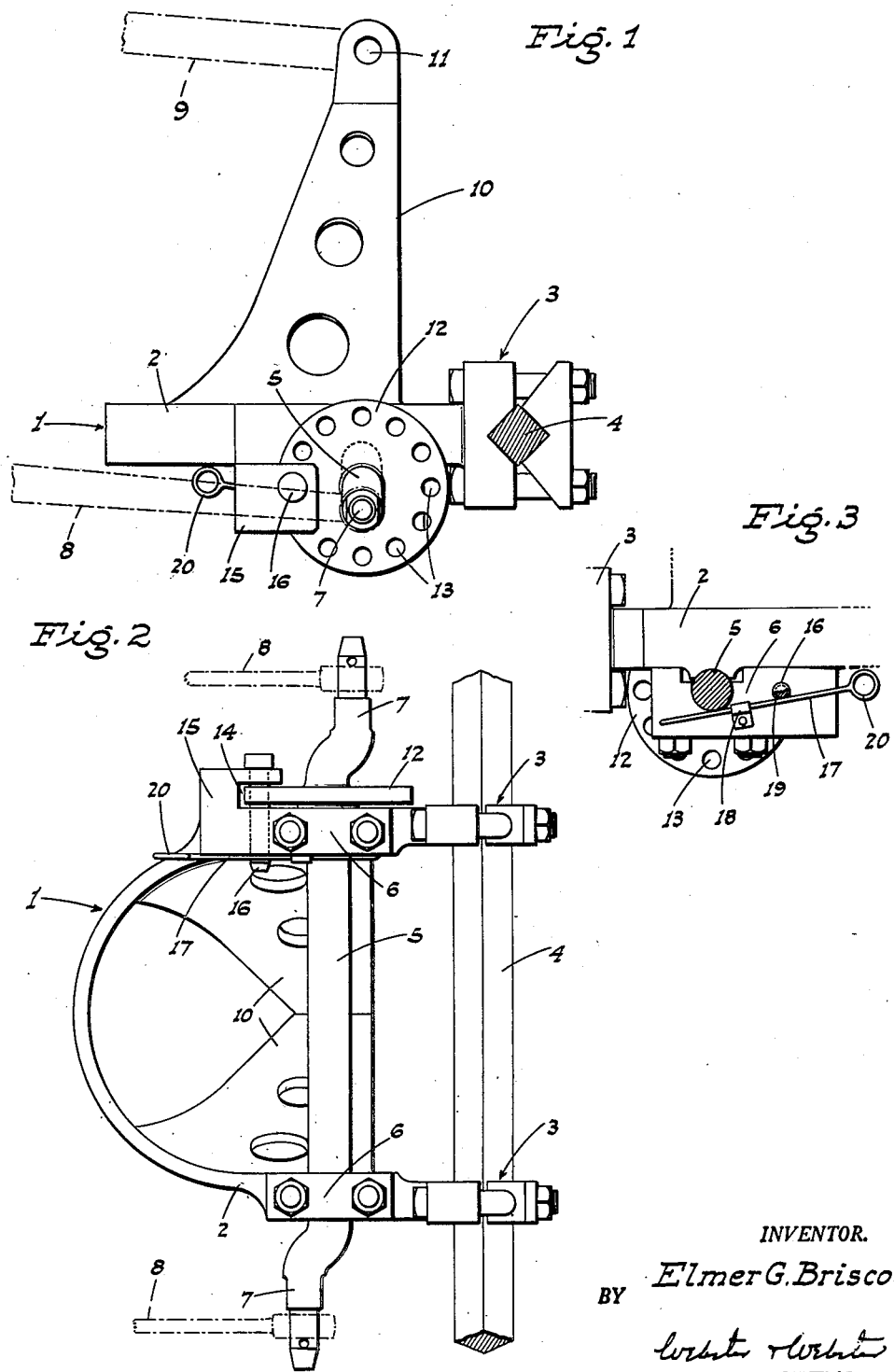

2,530,565

UNITED STATES PATENT OFFICE 2,530,565

TOOL BAR MOUNT

Elmer G. Briscoe, Fresno, Calif.

Application May 9, 1947, Serial No. 747,065

3 Claims. (Cl. 97—47)

This invention relates to a novel tool bar mount for adjustably attaching a tool bar to the power actuated lift link assembly at the rear end of an agricultural tractor.

Another object of the invention is to provide a mount, as above, especially adapted to permit of easy and quick adjustment, of a transverse tool bar, to set the angularity thereof in a vertical plane transversely of the direction of travel; i. e. to level said tool bar or adjust it with one end higher than the other if working conditions so require.

A further object of the invention is to provide a tool bar mount, as in the preceding paragraph, which includes a cross shaft having opposed cranks on opposite ends thereof adapted to couple to corresponding links in the lift and draft link assembly, rotation of said cross shaft causing adjustment of the tool bar, and a novel locking unit being arranged with the cross shaft to releasably hold the same in any selected position of rotative adjustment.

It is also an object of the present invention to provide a novel locking unit for the adjustable cross shaft, which comprises a disc fixed radially on the cross shaft and having a circumferential row of holes therein concentric to the shaft axis; the frame of the mount having a slotted portion in which the disc runs, and a locking pin projecting between opposite sides of said slotted portion and through a selected one of the holes in the disc in holding relation to the shaft.

A further object of the invention is to provide a practical and convenient tool bar mount, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the tool bar mount.

Fig. 2 is a bottom plan view of the same.

Fig. 3 is a fragmentary cross section showing the holding spring cooperating with the locking pin.

Referring now more particularly to the characters of reference on the drawings, the tool bar mount comprises a generally horizontal frame 1 which is of U-shape in plan with the closed end foremost; such frame 1 including transversely spaced side legs 2. At their rear ends the side legs 2 are each fitted with a clamp unit 3, and the tool bar 4, which extends transversely of the direction of travel, is clamped at transversely spaced points in said clamp units 3.

A cross shaft 5 is journaled, as at 6, in connection with, and extends between, the side legs 2 of the U-frame 1; said cross shaft being formed, at the ends and beyond said legs 2, with opposed cranks 7.

The opposed cranks 7 are formed for pivotal connection with the rear ends of a pair of transversely spaced, rearwardly projecting lift and draft links 8 of a power actuated lift and draft assembly on the rear end of an agricultural tractor (not shown); said assembly also including, above the links 8 and centrally therebetween, a top stabilizing link 9 which likewise projects rearwardly. The frame 1 includes upwardly converging arms 10 fixed with the side legs 2, to form an A-frame. The top stabilizing link 9 is pivotally connected, as at 11, between the upper ends of the A-frame formed by the converging arms 10.

With the above arrangement it will be seen that rotative adjustment of the cross shaft 5 will alter the positions of the opposed cranks 7 relative to the tool bar 4, and as the transversely spaced lift links 8 are normally held against vertical motion the working angle of the tool bar 4 in a vertical plane transversely of the direction of travel will be varied. In this manner, i. e. by the simple rotative adjustment of the cross shaft 5, the tool bar 4 may be leveled or adjusted with one end or the other raised, at the selection of the operator, and as working conditions may require.

In any position of adjustment the cross shaft 5 is releasably held in such position by a novel locking unit which comprises the following:

A rigid disc 12 is fixed on the cross shaft 5 concentrically and radially thereof outwardly of the journals 6; such disc having a circumferential row of holes 13 therethrough in its peripheral portion.

The peripheral portion of said disc 12 runs in a slot or fork 14 of a block 15 carried on one of the side legs 2 of the frame 1. The block 15 has matching bores on opposite sides of the slot 14, and a locking pin 16 engages in said bores and projects across the slot through a selected one of the holes 13 in the disc 12, thus normally locking the latter against rotation. To adjust the cross shaft 5, and consequently the tool bar 4, the pin 16 is withdrawn and said shaft rotated to the desired new position. The pin is then replaced in its projecting relation through the disc. The pin 16 is normally held against retraction from the bores in the block 15 by means of a spring rod 17 fixed to one of the journals adjacent the cross shaft 5, as at 18, and extending in generally tangential relation to the free end of the pin 16 which projects somewhat, as shown.

Said free end of the pin is notched tangentially, as at 19, and the spring rod 17 is disposed so that it normally bears in said notch. At one end the spring rod 17 is formed with a hand eye 20, by means of which the spring rod 17 may be freed from the notched pin 16 to permit of withdrawal of the latter.

With the above holding or locking arrangement the cross shaft 5 is normally maintained against turning, but can be axially and quickly released for adjustment thereof.

The described tool bar mount provides a very practical and convenient structure for the attachment of a tool bar in adjustable relation to the power-actuated lift and draft link assembly of an agricultural tractor.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In an adjustable tool bar mount which includes a tool carrying frame and an adjustment shaft rotatably mounted in the frame and on which shaft are end cranks disposed at different circumferential positions with respect to the shaft; a means for selectively locking the shaft against rotation in any adjusted position, such means comprising a disc fixed to the shaft coaxially therewith and at a point adjacent the frame, the disc being provided with a circumferential row of holes disposed transversely through the disc, the frame being provided with a hole so disposed that any one of the holes in the disc may be selectively brought into alinement with the hole in the frame, and a pin adapted to be projected through the alined holes.

2. A structure as in claim 1 including a fork on the frame embracing the disc, the pin projecting through the fork when in engagement with the alined holes, and a spring rod mounted in the fork and effective to engage and bear tangentially against the pin under load.

3. A structure as in claim 2 in which the pin is provided with a notch in its periphery adapted to receive the spring rod therethrough.

ELMER G. BRISCOE.

REFERENCES CITED

The following references are of record in the file of this patent:

UNITED STATES PATENTS

| Number | Name | Date |
| --- | --- | --- |
| 1,916,945 | Ferguson | July 4, 1933 |
| 2,309,750 | Carrington | Feb. 2, 1943 |
| 2,311,551 | Laird | Feb. 16, 1943 |
| 2,352,491 | Orelind | June 27, 1944 |
| 2,381,552 | Mott | Aug. 7, 1945 |

OTHER REFERENCES

Plow Book copyright 1941, pages 2 and 4, published by Ferguson Sherman Manufacturing Corporation, Dearborn, Michigan.